United States Patent [19]

Ikumi

[11] Patent Number: 5,228,135
[45] Date of Patent: Jul. 13, 1993

[54] MULTIPORT CACHE MEMORY CONTROL UNIT INCLUDING A TAG MEMORY HAVING PLURAL ADDRESS PORTS AND A SNOOP ADDRESS PART

[75] Inventor: Nobuyuki Ikumi, Tokyo, Japan

[73] Assignee: Kabushiki Kaisha Toshiba, Kawasaki, Japan

[21] Appl. No.: 645,642

[22] Filed: Jan. 25, 1991

[30] Foreign Application Priority Data

Jan. 25, 1990 [JP] Japan .................................. 2-013536

[51] Int. Cl.[5] .................... G06F 12/00; G06F 13/00; G11C 15/00
[52] U.S. Cl. .............................. 395/425; 365/230.05; 364/DIG. 1; 364/243.41; 364/244.8; 364/965.9
[58] Field of Search ........................................ 395/425; 364/200 MS File, 900 MS File; 365/230.05

[56] References Cited

U.S. PATENT DOCUMENTS

| | | | |
|---|---|---|---|
| 4,493,033 | 1/1985 | Ziegler et al. | 395/425 |
| 4,604,683 | 8/1986 | Russ et al. | 395/425 |
| 4,811,280 | 3/1989 | Berkowitz et al. | 395/425 |
| 4,849,882 | 7/1989 | Aoyama et al. | 395/800 |
| 4,905,141 | 2/1990 | Brenza | 395/425 |
| 5,014,247 | 5/1991 | Albachten, III et al. | 365/230.05 |
| 5,056,002 | 10/1991 | Watanabe | 395/425 |
| 5,072,369 | 12/1991 | Theus et al. | 395/425 |
| 5,119,485 | 6/1992 | Ledbetter, Jr. et al. | 395/425 |

Primary Examiner—Glenn Gossage
Attorney, Agent, or Firm—Foley & Lardner

[57] ABSTRACT

A multiport cache memory control unit includes a central processing unit having N arithmetic units for executing arithmetic processing, a tag memory having N address ports for storing addresses, a multiport cache memory having N data ports for storing pieces of data at addresses which agree with the addresses stored in the tag memory, and a snoop address port through which a snoop operation is executed to detect an address signal. Arithmetic processing is executed in each of the arithmetic units by reading a piece of data from the cache memory after providing an address signal to the tag memory to check whether or not the data is stored in the cache memory. In cases where a cache miss occurs, a piece of data stored in a main memory unit is fetched through the snoop address port without halting the arithmetic processing. In cases where a snoop hit occurs, an address signal provided from another control unit is transmitted to the tag memory through the snoop address port without halting the arithmetic processing.

2 Claims, 4 Drawing Sheets

MULTIPORT CACHE MEMORY CONTROL UNIT INCLUDING A TAG MEMORY HAVING PLURAL ADDRESS PORTS AND A SNOOP ADDRESS PART

BACKGROUND OF THE INVENTION

1. Field of the Invention

The present invention relates to a multiport cache memory control unit in which the throughput of arithmetic processing is not lowered.

2. Description of the Background Art

FIG. 1 is a block diagram of a conventional multi processor system.

As shown in FIG. 1, a plurality of central processing units 1 (CPUs 1) which each are arranged in a conventional control unit are respectively operated in a conventional multi processor system. In addition, pieces of data are transmitted between a main memory unit 3 and each of the conventional control units through a system bus 2. Furthermore, communication is executed among the conventional control units through the system bus 2.

The main memory unit 3 has large capacity to store a large pieces of data so that the main memory unit 3 is formed of devices such as a dynamic random access memory (DRAM). However, read/write operations are slowly executed in the DRAM. Therefore, a conventional control unit provided with a cache memory, in which some of the pieces of data stored in the main memory unit 3 are stored, has been recently adopted to execute arithmetic processing in the conventional control unit. As a result, the arithmetic processing is executed at a high speed.

FIG. 2 is a block diagram of a conventional control unit having a cache memory.

As shown in FIG. 2, a conventional control unit is provided with the CPU 1 in which many types of arithmetic processing are executed, a cache memory 6 for storing some of the data stored in the main memory unit 3 at addresses, and a tag memory 7 for storing addresses of which the numbers agree with the numbers of the addresses of the cache memory 6 to function as an address book of the data stored in the cache memory 6. The conventional control unit is further provided with a selector 9 for selecting either an address signal provided from the CPU 1 or an address signal transmitted through the system bus 2, and a control circuit 10 for controlling operations executed in the conventional control unit.

In the above configuration, operations executed in the conventional control unit is explained.

When a piece of data DA1 stored at an address AD1 is required to execute arithmetic processing in the CPU 1, an address signal AD is transmitted from the CPU 1 to the tag memory 7 through the selector 9 to check whether or not the address AD1 is stored in the tag memory 7. In cases where the address AD1 is stored in the tag memory 7, an address hit occurs. The address hit means that the data DA1 is stored at the address AD1 of the cache memory 6. Thereafter, a data signal is transmitted from the CPU 1 to the cache memory through a process bus 4 and a processor bus interface 5 so that the data DA1 is read out from the cache memory 6 to the CPU 1. In addition, in cases where the data DA1 is changed with a piece of new data DA2 in the CPU 1, the new data DA2 is stored at the address AD1 of The cache memory 6 in place of the data DA1, if necessary.

The above operation is executed under control of the control circuit 10.

On the other hand, in cases where the address AD1 is not stored in the tag memory 7 when the address signal AD is provided to the tag memory 7, a cache miss occurs. The cache miss means that any piece of data is not stored at the address AD1 of the cache memory 6. In this case, the selection in the selector 9 is changed from the address signal AD provided from the CPU 1 to an address signal AD transmitted through the system bus 2 to fetch the data DA1 stored at the address AD1 under control of the control unit 10. In other words, a traffic operation is executed. Thereafter, the data DA1 stored at the address AD1 of the main memory unit 3 is fetched into the cache memory 6 through the system bus 2 and a system bus interface 8. Also, the address AD1 is stored in the tag memory 7 by the CPU 1. Thereafter, the data DA1 fetched into the cache memory 6 is read out from the cache memory 6 to the CPU 1. In addition, in cases where the data DA1 is changed with a piece of new data DA3 in the CPU 1, the new data DA3 is stored at the address AD1 of the cache memory 6 in place of the data DA1 by the CPU 1, if necessary. Also, the new data DA3 is stored at the address AD1 of the main memory unit 3 by the CPU 1 according to a protocol, if necessary.

However, as shown in FIG. 1, because one conventional control control unit shown in FIG. 2 is connected with the other conventional control units through the system bus 2, the data DA1 is still stored in the cache memories 6 of the other conventional control units even though the new data DA3 is stored at the address AD1 of the main memory unit 3 by the CPU 1 of one conventional control unit shown in FIG. 2 (first case). Therefore, though the data DA1 stored into the cache memories 6 of the other conventional control units is stale, the arithmetic processing is executed by utilizing the data DA1 in the other conventional control units. This means that the consistency of the data is not maintained because the data DA3 differs from the data DA1.

Also, even through the new data DA3 is stored at the address AD1 of the cache memory 6 in place of the data DA1 by the CPU 1 in one conventional control unit shown in FIG. 2, in cases where the data DA1 stored at the address AD1 of the main memory unit 3 is not rewritten to the new data DA3 according to a protocol (second case), the data DA1 is fetched from the main memory unit 3 into the cache memories 6 of the other conventional control units. Thereafter, the arithmetic processing is executed by utilizing the data DA1 in the other conventional control units though the data DA1 fetched into the cache memories 6 is stale. This means that the consistency of the data is not maintained.

Therefore, a snoop operation is executed by each of the conventional control units to watch both the traffic operation executed by the conventional control units and the rewrite of the data in the main memory unit 3 so that the consistency of the data is maintained.

For example, in cases where the data DA1 stored at the address AD1 of the main memory unit 3 is rewritten to the new data DA3 after the data DA1 stored in the cache memory 6 is rewritten to the new data DA3 in one conventional control unit (the first case), the rewrite of the data in the main memory unit 3 is promptly detected by the snoop operation executed by the other conventional control units. Thereafter, in cases where the address AD1 is stored in the tag memories 7 of the other conventional control units, the new data DA3 stored in the main memory unit 3 is fetched at the address AD1 of the cache memories 6 of the other conventional control units.

Also, though the new data DA3 is stored at the address AD1 of the cache memory 6 in place of the data DA1 in one conventional control unit, in cases where the data DA1 stored at the address AD1 of the main memory unit 3 is not rewritten to the new data DA3 (the second case), the snoop operation is always executed by the one conventional control unit to watch the traffic operation executed by the other conventional control units. In cases where the traffic operation is executed by one of the other conventional control units to fetch the data DA1 stored at the address AD1 of the main memory unit 3, the other conventional control unit detected the traffic operation is interrupted to halt operations executed in the other conventional control unit. After the operations executed in the other conventional control unit is halted, the data DA1 stored at the address AD1 of the main memory unit 3 is rewritten to the new data DA3 by the one conventional control unit. Thereafter, the operations in the other conventional control unit detected the traffic operation is resumed. Therefore, the new data DA3 stored at the address AD1 of the main memory unit 3 is fetched into the other conventional control unit.

Accordingly, drawbacks resulting from the first and second cases can be resolved.

However, when the traffic operation is executed by one conventional control unit in the conventional multi processor system, because the traffic operation is detected by each of the other conventional control units in which the snoop operation is always executed, the selection in the selector 9 of each of the other conventional control units is necessarily changed from the address signal AD provided from the CPU 1 to the address signal AD transmitted through the system bus 2. Therefore, because the address signal AD generated in the CPU 1 cannot be transmitted to the tag memory 7, the arithmetic processing executed in each of the other conventional control units is necessarily halted even though the address AD1 is not stored in the tag memory 6 of the other conventional control units. In this case, it is not necessary to halt the arithmetic processing in some of the other conventional control units to maintain the consistency of the data in cases where the address AD1 is not stored in the tag memory 6 in some of the other conventional control units.

Accordingly, operating time is lost in each of the conventional control unit so that the throughput of the arithmetic processing is unnecessarily lowered in the conventional multi processor system.

Also, in cases where the CPU 1 is formed of a restricted instruction set computer (RISC) type in which one instruction is executed in a clock cycle, a single data bus arranged in the processor bus 4 is enough to execute the arithmetic processing in the CPU 1. However, in cases where the CPU 1 has a plurality of arithmetic units in which many instructions are executed in a clock cycle at the same time, another drawback is generated in the conventional multi processor system.

That is, when a plurality of read requests are provided from a plurality of arithmetic units accommodated in the CPU 1 to the cache memory 6 at the same time, an arbitration operation is executed under control of the control circuit 10 so that the plurality of the read requests are processed one after another. In this case, one arithmetic unit selected by the control circuit 10 can access to the cache memory 6 while the other arithmetic units are left in a waiting condition. This means that the arithmetic processing in the other arithmetic units is temporarily halted. Therefore, the throughput of the arithmetic processing deteriorates in the conventional multi processor system.

SUMMARY OF THE INVENTION

A first object of the present invention is to provide, with due consideration to the drawbacks of such conventional multi processor system, a multiport cache memory control unit in which pieces of data are simultaneously transmitted between a cache memory and a central processing unit (CPU) having a plurality of arithmetic units without lowering the throughput of arithmetic processing.

A second object of the present invention is to provide a multiport cache memory control unit in which arithmetic processing executed in a CPU of the control unit is not halted even through either a traffic operation or a snoop operation is executed in the control unit.

The first and second objects are achieved by the provision of a multiport cache memory control unit for executing arithmetic processing while fetching pieces of data stored in a main memory through a system bus with which another control unit CU is connected, comprising:

a central processing unit having N arithmetic units (N is an integer) for executing the arithmetic processing in each of the arithmetic units independent of one another, each of the arithmetic units generating an address signal indicating an address and a data signal indicating a piece of data in cases where the data stored at the address is required by each of the arithmetic units;

a tag memory having N address ports for storing addresses, each of the address signals being provided from the central processing unit to the tag memory through one of the address ports to check whether or not an address AD1 indicated by one of the address signals AS1 is stored in the tag memory;

a cache memory having N data ports for storing pieces of data at addresses which agree with the addresses stored in the tag memory, (1) each of the data signals being provided from the central processing unit to the cache memory through one of the data ports to read out a piece of data stored at the address AD1 to the central processing unit in cases where it is checked with the address signal AS1 that the address AD1 is stored in the tag memory, and (2) a piece of data DA2 stored at an address being rewritten with another piece of data DA3 in cases where the data DA2 is changed to the data DA3 by executing the arithmetic processing in one of the arithmetic units of the central processing unit; and a snoop address port connecting the tag memory with the system bus, through which (1) the address signal AS1 is provided to the system bus to detect a piece of data stored at the address AD1 of the main memory in cases where it is checked with the address signal AS1 that the address AD1 is not stored in the tag memory, the data stored at the address AD1 of the main memory being fetched into the cache memory, and (2) an address signal AS2 provided from another control unit CU through the system bus to fetch to a piece of data stored at an address AD2 of the main memory is detected to provide a piece of data stored at the address AD2 of the cache memory to another control unit CU through the system bus in cases where the data stored at the address AD2 of the cache memory is rewritten by the central processing unit.

In the above configuration, arithmetic processing is executed in each of the arithmetic units while utilizing pieces of data. When a piece of data DA1 stored at an address AD1 is required by an arithmetic unit to continue the arithmetic processing, an address signal is sent to the tag memory through an address port to check whether or not the address AD1 indicated by each of the address signals is stored in the tag memory.

In cases where the address AD1 is stored in the tag memory, an address hit occurs. The address hit means that the data DA1 required by the arithmetic unit is stored at the address AD1 of the cache memory. Therefore, a data signal is sent from the arithmetic unit to the cache memory to read out the data DA1 stored at the address AD1 from the cache memory to the arithmetic unit. Thereafter, the arithmetic processing is continued in the arithmetic unit while utilizing the data DA1.

Also, in cases where pieces of data are required by a plurality of arithmetic units at the same time, a plurality of address signals are sent to the tag memory through a plurality of address ports independent of one another, and a plurality of data signals are sent to the cache memory from the arithmetic units through a plurality of address ports independent of one another.

Therefore, even through pieces of data are required by a plurality of arithmetic units at the same time, the pieces of data are read out to the arithmetic units at the same time because each of the address signals is sent through an address port and each of the data signals is sent through a data port. Accordingly, the throughput of the arithmetic processing is not lowered.

On the other hand, in cases where the address AD1 is not stored in the tag memory, a cache miss occurs. The cache miss means that the data DA1 required by one arithmetic unit is not stored at the address AD1 of the cache memory. Therefore, a data signal is sent from the tag memory to the main memory through the snoop address port to fetch the data DA1 stored at the address AD1. Thereafter, the data DA1 stored at the address AD1 of the main memory is fetched into the cache memory before the data DA2 is read out to the one arithmetic unit.

Accordingly, because the data signal is sent to the main memory through the snoop address port without utilizing any of the address ports, the arithmetic processing can be continued in the other arithmetic units.

Also, in cases where a piece of data DA3 generated in an arithmetic unit is stored at the address AD2 of the cache memory through a data port in place of the data DA2 in one multiport cache memory control unit, the data DA2 still stored at the address AD2 of the main memory becomes stale. Thereafter, when a cache miss occurs in another control unit CU connected with the multiport cache memory control unit through the system bus, an address signal As2 is provided to the system bus from another control unit CU to fetch the data DA2 stored in the main memory. In this case, the address signal AS2 transmitted through the system bus is always watched by the multiport cache memory control unit with the snoop address port. Therefore, the address signal AS2 provided by another control unit CU is detected by the multiport cache memory control unit through the snoop address port. Thereafter, the data DA3 stored in the cache memory of the multiport cache memory control unit is transmitted to another control unit CU.

Accordingly, even though the address signal AS2 transmitted through the system bus is always watched by the multiport cache memory control unit, the arithmetic processing can be continued in the central processing unit of the multiport cache memory control unit because any of the address ports is not utilized to watch the address signal transmitted through the system bus.

DETAILED DESCRIPTION OF PREFERRED EMBODIMENTS

Preferred embodiments according to the present invention are described with reference to the drawings.

Figure 1:
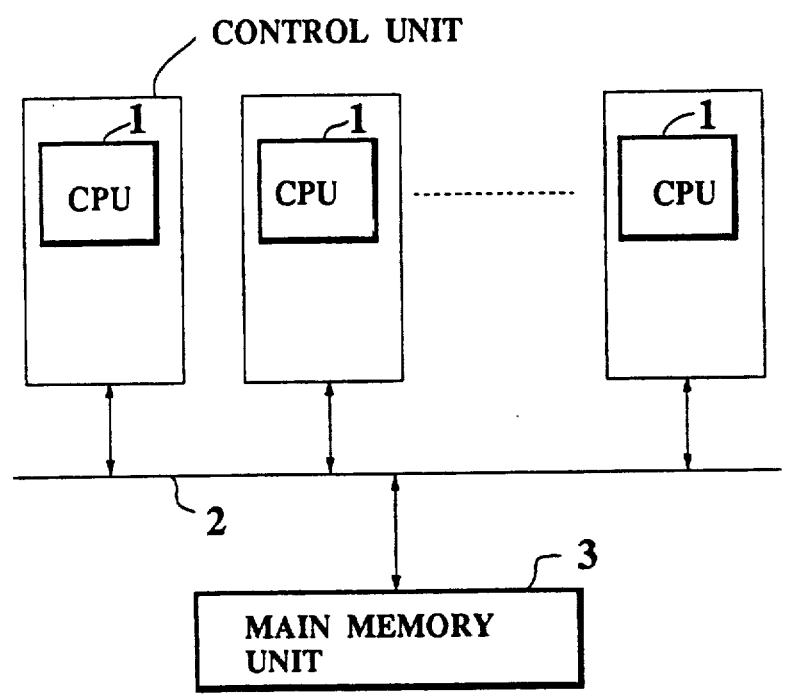
FIG. 1 is a block diagram of a conventional multi processor system.
Figure 2:
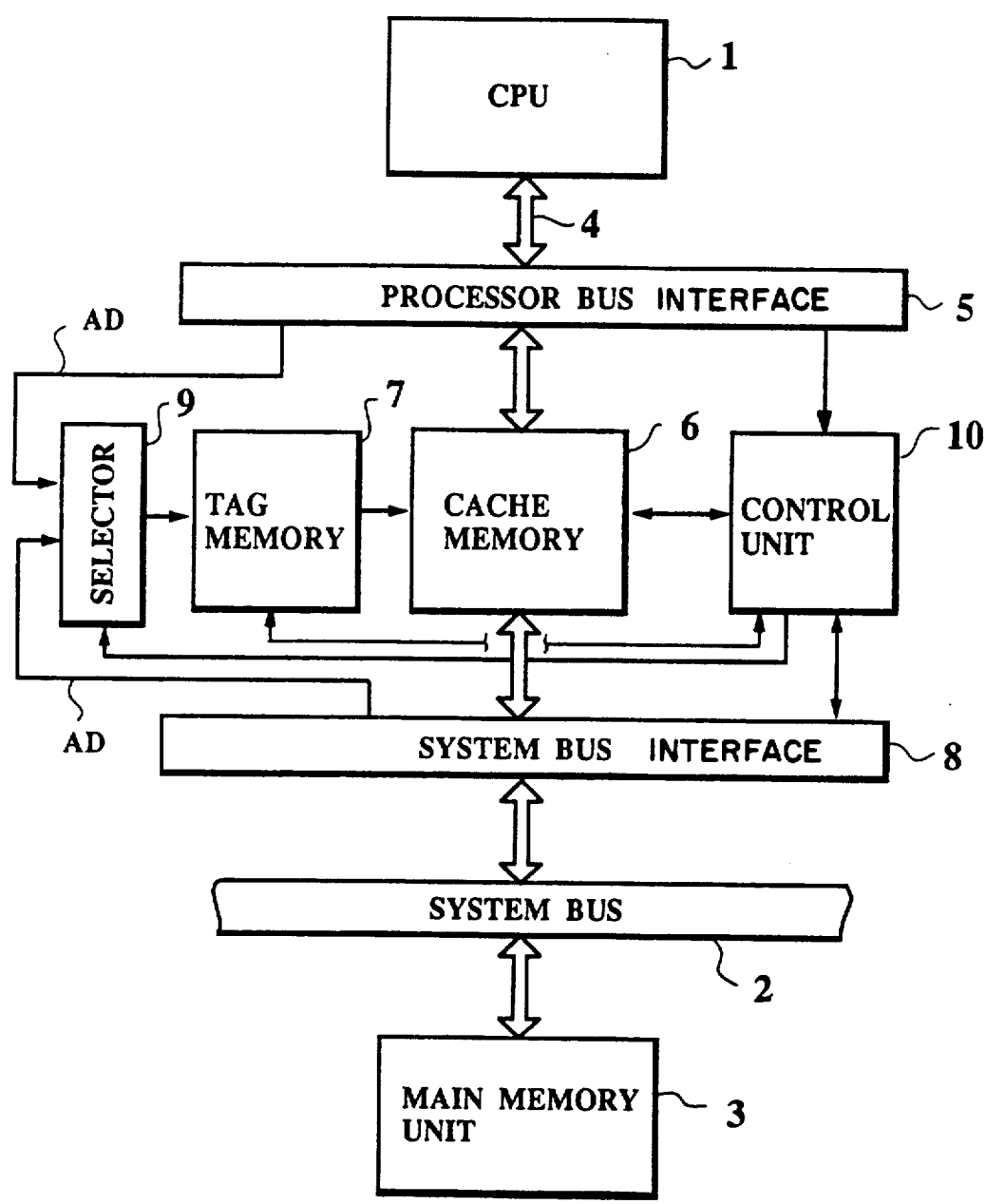
FIG. 2 is a block diagram of a conventional control unit shown in FIG. 1.

A multi processor system relating to the present invention comprises a plurality of multiport cache memory control units and a main memory unit 18 connected with the control units through a system bus interface 16 and a system bus 17, in the same manner as the conventional multi processor system shown in FIG. 1. The control units are operated independent of one another.

Figure 3:
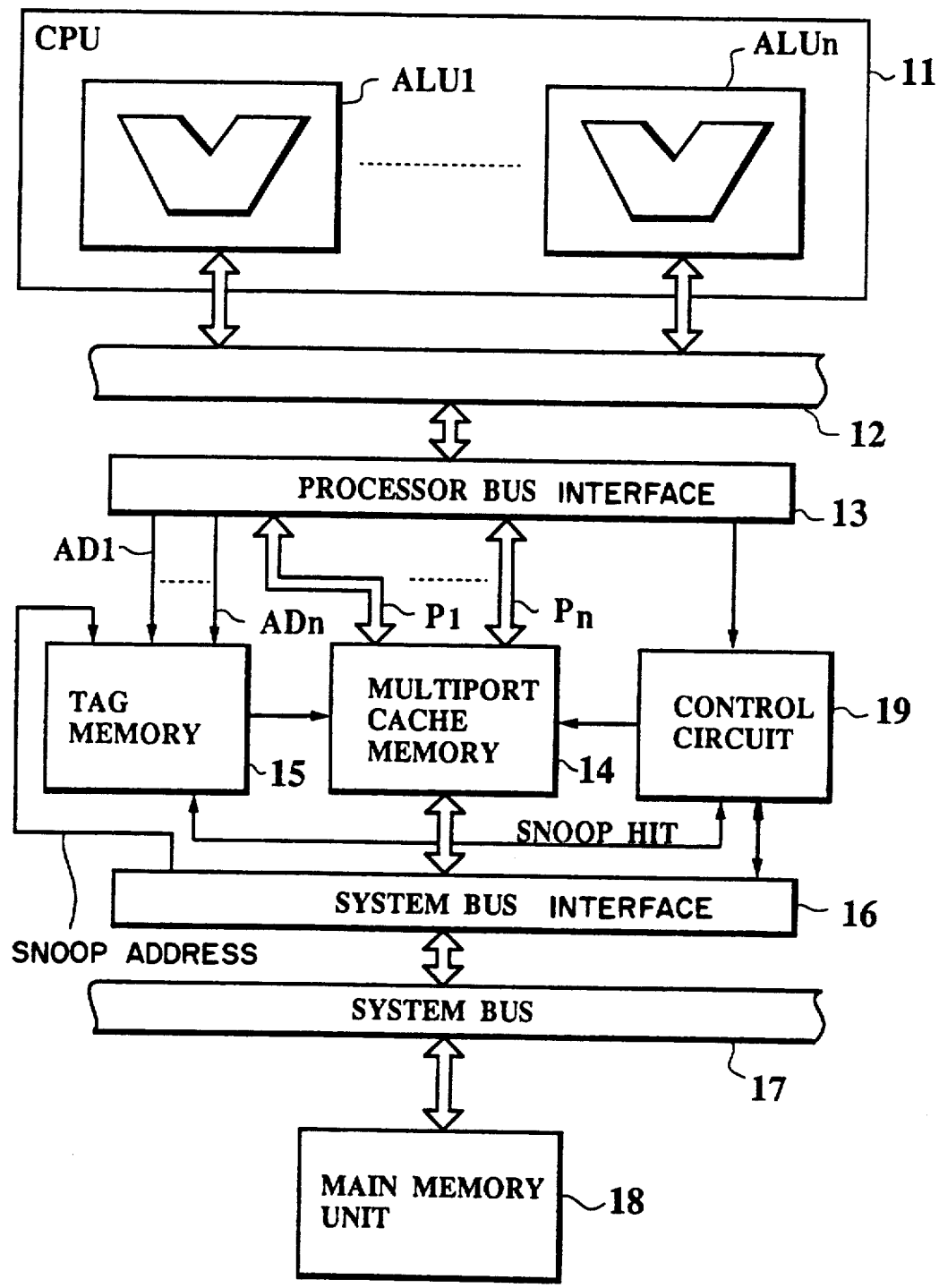
FIG. 3 is a block diagram of one of the multiport cache memory control units according to an embodiment of the present invention.

FIG. 3 is a block diagram of one of the multiport cache memory control units according to an embodiment of the present invention.

As shown in FIG. 3, one multiport cache memory control unit according to an embodiment of the present invention comprises a central processing unit (CPU) 11 is provided with arithmetic logic units ALU1 to ALUn for executing arithmetic processing, a multiport cache memory 14 provided with plurality of data ports P1 to Pn for storing pieces of data at addresses, a tag memory 15 for storing addresses of which the numbers agree with the numbers of the addresses of the multiport cache memory 14 to function as an address book of the data stored in the multiport cache memory 14, and a control circuit 19 for controlling operations executed in one multiport cache memory control unit. In addition, a large pieces of data including the data stored in the multiport cache memory 14 are stored in the main memory unit 18 at prescribed addresses.

The tag memory 15 is provided with address ports AD1 to ADn to receive address signals from the arithmetic logic units ALU1 to ALUn. The address signals are provided to the tag memory 15, independent of one another. When a piece of data DA1 stored at an address ADD1 of the multiport cache memory 14 is required by the arithmetic logic unit ALUi (i=1 to n), an address signal is provided from the arithmetic logic unit ALUi to the tag memory 15 through the address port ADi to check whether or not the address ADD1 is stored in the tag memory 15. In addition, because the tag memory 15 is privately provided with a snoop address port SAD to execute a snoop operation under control of the control circuit 19, address signals provided to the system bus 17 by the other multiport cache memory control units are always watched by the tag memory 15 of one multiport cache memory control unit through the snoop address port SAD according to the snoop operation.

The multiport cache memory 14 receives data signals from the arithmetic logic units ALU1 to ALUn through a processor bus 12, a processor bus interface 13 and the data ports P1 to Pn. The data signals are provided to the multiport cache memory 14, independent of one another. When a data signal is provided to the multiport cache memory 14 through the data port Pi, the data DA1 stored at the address ADD1 which is indicated by the address signal provided to the tag memory 15 through the address port ADi is provided from the multiport cache memory 14 to the arithmetic logic unit ALUi through the data port Pi to execute arithmetic processing in the arithmetic logic unit ALUi.

In the above configuration, operations executed in one multiport cache memory control unit are described.

In cases where a piece of data DA1 stored at an address ADD1 is required in the arithmetic logic units ALUi of the CPU 11 to continue arithmetic processing, an address signal indicating the address ADD1 is provided to the tag memory 15 through the address port ADi to check whether or not the address ADD1 is stored in the tag memory 15. In cases where the address ADD1 is stored in the tag memory 15, an address hit occurs so that a data signal is provided from the arithmetic logic unit ALUi to the multiport cache memory 14 through the data port Pi to read out the data DA1 stored at the address ADD1. Therefore, the arithmetic processing is continued by utilizing the data DA1 in the arithmetic logic unit ALUi. In the same manner, in cases where pieces of data are simultaneously required in the plurality of arithmetic logic units ALUi, a plurality of address signals are transmitted through a plurality of address ports ADi to the tag memory 15, independent of one another. Also, a plurality of data signals are transmitted through a plurality of data ports Pi to read out the pieces data, independent of one another.

Accordingly, the arithmetic processing can be executed in each of the arithmetic logic units ALUi without executing an arbitration operation.

On the other hand, in cases where the address ADD1 is not stored in the tag memory 15 when the address signal is provided to the tag memory 15, a cache miss occurs so that a traffic operation is executed by one multiport cache memory control unit. That is, the address signal is transmitted to the system bus 17 through the snoop address port SAD and the system bus interface 16 to fetch the data DA1 stored at the address ADD1 of the main memory unit 18 into the multiport cache memory 14.

In this case, a snoop operation is always executed by each of the other multiport cache memory control units so that the traffic operation executed by one multiport cache memory control unit is promptly detected by the other multiport cache memory control units, prior to the fetch of the data DA1 executed by one multiport cache memory control unit. That is, the address signal provided to the system bus 17 by one multiport cache memory control unit according to the traffic operation is detected by the other multiport cache memory control units through the snoop address port SAD according to the snoop operation. After detecting the traffic operation in the other multiport cache memory control units, it is checked in each of the other multiport cache memory control units whether or not the data DA1 stored at the address ADD1 of the multiport cache memory 14 has been already rewritten to a piece of new data DA2 without rewriting the data DA1 stored at the address ADD1 of the main memory unit 18 to the new data DA2 by each of the other multiport cache memory control units.

In cases where the data DA1 stored at the address ADD1 of the multiport cache memory 14 is not rewritten in any of the other multiport cache memory control units, the data DA1 stored at the address ADD1 of the main memory unit 18 is effective. Therefore, the data DA1 stored at the address ADD1 of the main memory unit 18 is fetched into the multiport cache memory 14 of one multiport cache memory control unit without being interrupted by any of the other multiport cache memory control units. In this case, the arithmetic processing executed in the other multiport cache memory control units is not halted because the snoop operation is executed by privately utilizing the snoop address port SAD without utilizing any of the address ports ADi.

On the other hand, in cases where the data DA1 stored at the address ADD1 of the multiport cache memory 14 has been already rewritten to a piece of new data DA2 without rewriting the data DA1 stored at the address ADD1 of the main memory unit 18 to the new data DA2 by one of the other multiport cache memory control units, the data DA1 stored at the address ADD1 of the main memory unit 18 is not effective. Therefore, the traffic operation of one multiport cache memory control unit is interrupted by one of the other multiport cache memory control units to halt the arithmetic processing executed in the arithmetic logic unit ALUi of one multiport cache memory control unit. Thereafter, according to a protocol, the new data DA2 stored in the multiport cache memory 14 of one of the other multiport cache memory control units is transmitted to the address ADD1 of the multiport cache memory 14 of one multiport cache memory control unit through the system bus 17 (case-1). Thereafter, the arithmetic processing is resumed in the arithmetic logic unit ALUi of one multiport cache memory control unit. Or, according to another protocol, the new data DA2 stored in the multiport cache memory 14 of one of the other multiport cache memory control units is transmitted to the address ADD1 of the main memory unit 18 so that the new data DA2 stored in the main memory unit 18 is fetched into the multiport cache memory 14 of one multiport cache memory control unit (case-2). Thereafter, the arithmetic processing is resumed in the arithmetic logic unit ALUi of one multiport cache memory control unit.

Accordingly, because the traffic operation of one multiport cache memory control unit is detected by the other multiport cache memory control units through the snoop address ports SAD, the arithmetic processing is not halted in any of the other multiport cache memory control units. In addition, in cases where the data DA1 stored at the address ADD1 of the multiport cache memory 14 is not rewritten in any of the other multiport cache memory control units, the arithmetic processing executed in one multiport cache memory control unit is not halted so that the throughput of the arithmetic processing is not lowered.

Also, in cases where the data DA1 stored at the address ADD1 of the main memory unit 18 is rewritten to a piece of new data DA3 by one multiport cache memory control unit, the rewrite of the data in the main memory unit 18 is promptly detected by the other multiport cache memory control units through the snoop address ports SAD. In this case, the arithmetic processing executed in the other multiport cache memory control units is not halted because the CPU 11 is connected with the tag memory 15 through the address ports AD1 to ADn. Thereafter, the new dat DA3 stored in the main memory unit 18 is transmitted to the multiport cache memories 14 of the other multiport cache memory control units.

Accordingly, the arithmetic processing is not halted in the other multiport cache memory control units in cases where the address ADD1 is not stored in the tag memories 15 of the units. Therefore, the throughput of the arithmetic processing is not lowered.

Next, input/output operations in the multiport cache memory 14 and the tag memory 15 is described in detail with reference to FIG. 4.

Figure 4:
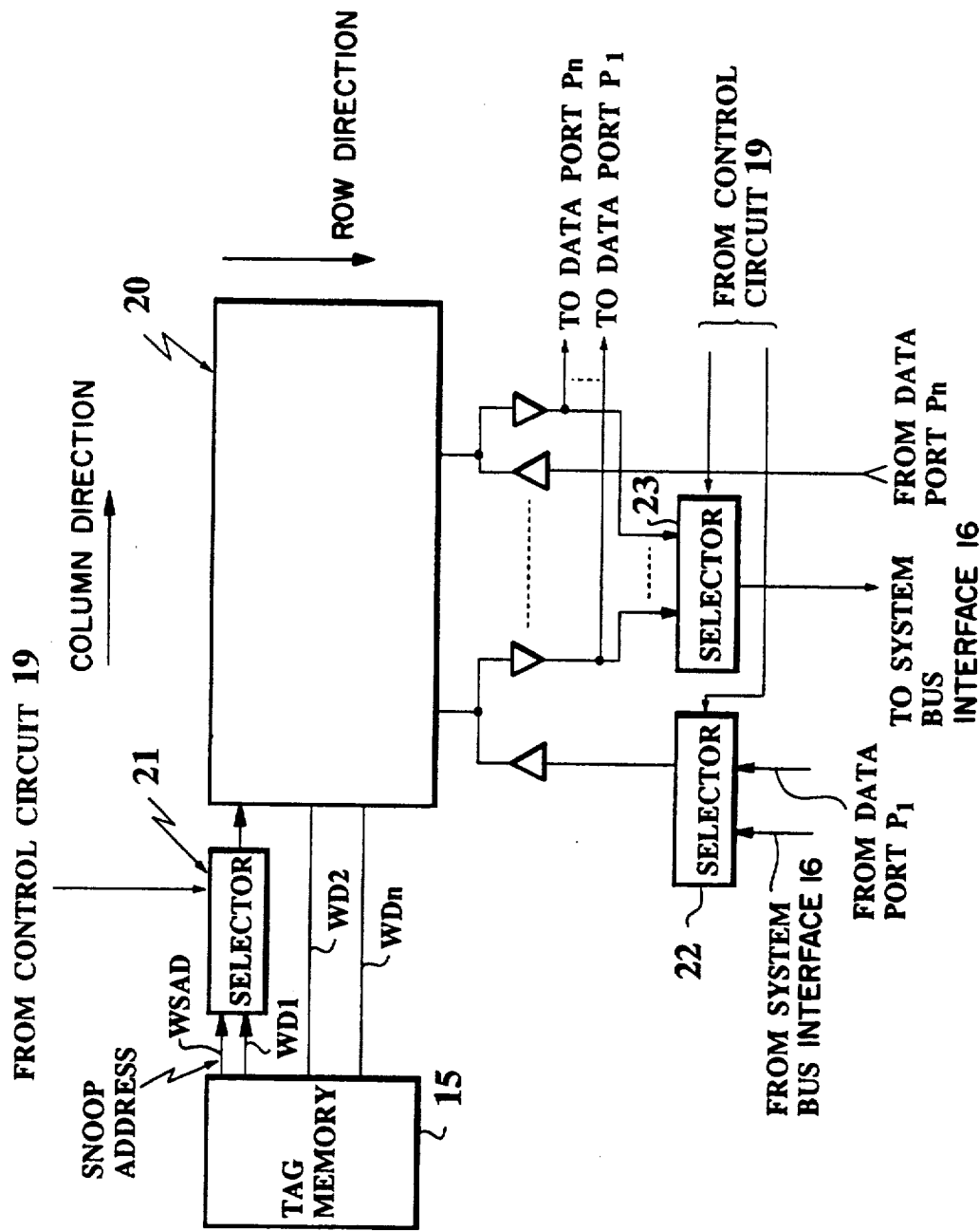
FIG. 4 is detail block diagram of a multiport cache memory and a tag memory shown in FIG. 3.

FIG. 4 is a detail block diagram of the multiport cache memory 14 and the tag memory 15 shown in FIG. 3.

As shown in FIG. 4, the multiport cache memory 14 of one multiport cache memory control unit is provided with a cell array 20 in which a row direction designates "word" and a column direction designates "bit", word lines WD1 to WDn for respectively transmitting an address hit signal to the cell array 20 when an address hit occurs in the tag memory 15, and a snoop address word line WSAD for transmitting either a snoop hit signal or a cache miss signal to the cell array 20 from the tag memory 15 when either a snoop hit or a cache miss occurs. That is, the snoop hit occurs in cases where an address signal provided to the system bus 17 by one of the other multiport cache memory control units is detected through the snoop address port SAD during the snoop operation under control of control circuit 19.

In addition, the multiport cache memory 14 is provided with a selector 21 for selecting either a snoop hit signal (or a cache miss signal) transmitted through the snoop address word line WSAD or an address hit signal transmitted through the word line WD1 to send the hit signal selected to the cell array 20, a selector 22 for selecting either a data signal transmitted from the system bus interface 16 or a data signal transmitted through the data port P1 from the arithmetic logic unit ALU1 to send the data signal selected to the cell array 21, and a selector 23 for selecting a data signal from among data signals transmitted to the CPU 11 from the cell array 20 to send the data signal selected to the main memory unit 18 through the system bus interface 16.

In cases where an address hit occurs when an address signal is provided from the arithmetic logic unit arithmetic logic unit ALUi to the tag memory 15, an address hit signal is transmitted from the tag memory 15 to the cell array 20 through the word line WDi.

In cases where neither a snoop hit nor a cache miss occurs in one multiport cache memory control unit, an address hit signal transmitted through the word line WD1 is selected by the selector 21. In addition, a data signal transmitted from the CPU 11 through the data port P1 is selected by the selector 22.

Also, in cases where either a snoop hit or a cache miss occurs in one multiport cache memory control unit, a hit signal transmitted through the snoop address word line WSAD is selected by the selector 21. In addition, a data signal transmitted through the system bus interface 16 is selected by the selector 22.

Through the word line WD1 and the data port P1 are connected with the selector 21, 22 in this embodiment, it is preferable that one of the word lines WD1 and WDn be connected with the selector 21 and one of the data ports P1 to Pn be connected with the selector 22.

In the above configuration, in cases where neither a snoop hit nor a cache miss occurs in one multiport cache memory control unit, an address hit signal transmitted to the word line WD1 is sent to the cell array 20 of the multiport cache memory 14 through the selector 21. In addition, a data signal generated in the arithmetic logic unit ALU1 is sent to the cell array 20 of the multiport cache memory 14 through the selector 22. Therefore, the arithmetic processing is executed in the arithmetic logic unit ALU1.

In cases where a cache miss occurs in one control unit shown in FIG. 4 because an address ADD1 is not stored in the tag memory 15, arithmetic processing executed in one of the arithmetic logic units ALUi of the CPU 11 is halted under control of the control circuit 19. Thereafter, the selection of the selector 21 is changed from the word line WD1 to the snoop address word line WSAD to send a cache miss signal to the cell array 20, and the selection of the selector 22 is changed from the data port P1 to the system bus interface 16 under control of the control circuit 19. Thereafter, an address signal indicating the address ADD1 is sent to the system bus 17 through the snoop address port SAD to fetch a piece of data stored at the address ADD1 of either the main memory unit 18 or the multiport cache memory 14 of one of the other control units according to a traffic operation. Thereafter, when the data stored at the address ADD1 is detected, for example, in the main memory unit 18, the data is fetched from the main memory unit 18 into the multiport cache memory 14 through the selector 22. The data fetched into the multiport cache memory 14 is stored at the address ADD1 because the address ADD1 is indicated by the cache miss signal transmitted from the tag memory 15.

Also, in cases where a piece of data DA2 generated in the arithmetic logic unit ALUi has been already stored at the address ADD1 of the cell array 20 through the data port Pi in one control unit when a cache miss occurs in the other control unit because the address ADD1 is not stored in the tag memory 15 of the other control unit, a traffic operation is executed by the other control unit to fetch a piece of data stored at the address ADD1 of the main memory unit 18. The traffic operation of the other control unit is promptly detected by a snoop operation always executed by one control unit with a snoop address port SAD. Therefore, when the traffic operation is detected by one control unit, the arithmetic processing executed in the other control unit is halted, and the data DA2 stored at the address ADD1 of the cell array 20 of one control unit is transmitted to the main memory unit 18 through the selector 23. Thereafter, the data stored DA2 stored in the main memory unit 18 is fetched into the multiport cache memory 14 of the other control unit before the arithmetic processing is resumed in the other control unit.

Accordingly, the arithmetic processing executed in the CPU 11 of one control unit is not halted because the snoop operation is executed by utilizing the snoop address port SAD.

Next, the improvement of the throughput of the arithmetic processing is quantitatively described.

In cases where the number of arithmetic logic units ALUi of a control unit is $\gamma$, a ratio of access time to arithmetic processing time in each of the arithmetic logic units ALUi is $\alpha$ ($0<\alpha<1$), a ratio of a cache hit to an access executed by each of the arithmetic logic units ALUi is $\beta$ ($0<\beta<1$), and the access time to a system bus is M (an execution of an instruction is one unit of the access time), a ratio W of halt time of the arithmetic processing executed in the control unit to an execution time of an instruction is determined according to an equation $W = \alpha * (1-\beta) * M * (\gamma-1)$ in the conventional control unit.

With the substitution $\alpha=0.2$, $\beta=0.98$, $M=5$ and $\gamma=4$, $W=0.06$ (6%) is given.

Also, in cases where the cache hit rate $\beta$ is decreased to 0.9, the value of the ratio W reaches 0.3 (30%). This value further deteriorates in the conventional control unit in cases where a snoop hit occurs.

However, because the arithmetic processing executed in one control unit is not halted by a cache miss occurring in the other control unit according to the present invention, the halt time of the arithmetic processing can be considerably shortened.

Also, in cases where the multiport cache memory 14 and the tag memory 15 according to the present invention are utilized for a system in which a plurality of arithmetic units are provided to execute a plurality of instructions at the same time, a loss time resulting from the arbitration operation is considerably shortened even though the arithmetic processing is executed in a plurality of arithmetic units at the same time.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed:

1. A multiport cache memory control unit for executing arithmetic processing while fetching data stored in a main memory through a system bus to which another multiport cache memory control unit is connected, comprising:
   (a) a central processing unit, having N arithmetic units (N being an integer), for executing arithmetic processing in each of said arithmetic units independent of one another, each of said arithmetic units generating an address signal indicating an address and a data signal indicating data when data stored at said address is required by each of said arithmetic units;
   (b) a tag memory, having N address ports, for storing addresses, each address signal being provided from said central processing unit to said tag memory through one of said address ports to determine whether an address AD1 indicated by an address signal AS1 is stored in said tag memory;
   (c) a cache memory, having N data ports, for storing data at addresses which agree with said addresses stored in said tag memory,
      (1) each data signal being provided from said central processing unit to said cache memory through one of said data ports to transfer data DA1 stored at said address AD1 to said central processing unit when it is determined with said address signal AS1 that said address AD1 is stored in said tag memory, and
      (2) data DA2 stored at an address being rewritten with data DA3 in cases where said data DA2 is changed to said data DA3 by executing arithmetic processing in one of said arithmetic units of said central processing unit; and
   (d) a snoop address port connecting said tag memory with said system bus, through said snoop address port
      (1) said address signal AS1 being provided to said system bus to detect data stored at said address AS1 of said main memory when it is determined with said address signal AS1 that said address AD1 is not stored in said tag memory, data stored at said address AD1 of said main memory being fetched into said cache memory, and
      (2) an address signal AS2, provided from said another control unit through said system bus to fetch data stored at an address AD2 of said main memory, being detected to provide data stored at said address AD2 of said cache memory to said another control unit through said system bus when data stored at said address AD2 of said cache memory is rewritten by said central processing unit.

2. A multiport cache memory control unit according to claim 1, additionally including:
   (a) N word lines connecting said tag memory with said cache memory for respectively transmitting an address hit signal indicating that an address, at which data required by one of said arithmetic units is stored, is stored in said tag memory;
   (b) a snoop address word line connecting said tag memory with said cache memory for
      (2) transmitting a cache miss signal when an address, at which data required by one of said arithmetic units is stored, is not stored in the tag memory, and
      (2) transmitting a snoop hit signal when said address signal AS2 is detected;
   (c) a first selector for selecting either one of said word lines or said snoop address word line to send a signal, which is one of said address hit signal, said cache miss signal, and said snoop hit signal, transmitted through a line selected thereby to said cache memory;
   (d) a second selector for selecting either a data signal transmitted through said system bus or a data signal transmitted from one of said arithmetic units and for sending a data signal so selected to said cache memory; and
   (e) a third selector for selecting a data signal from among data signals generated by said arithmetic units and for sending a data signal so selected to said system bus.

* * * * *